INVENTORS
GEORGE W. SHEPHERD JR.
HENRY A. HAMMERSTEIN

BY
ATTORNEY

Sept. 29, 1964   G. W. SHEPHERD, JR., ETAL   3,151,310
PICTORIAL POSITION DISPLAY
Filed Sept. 21, 1960   3 Sheets-Sheet 2
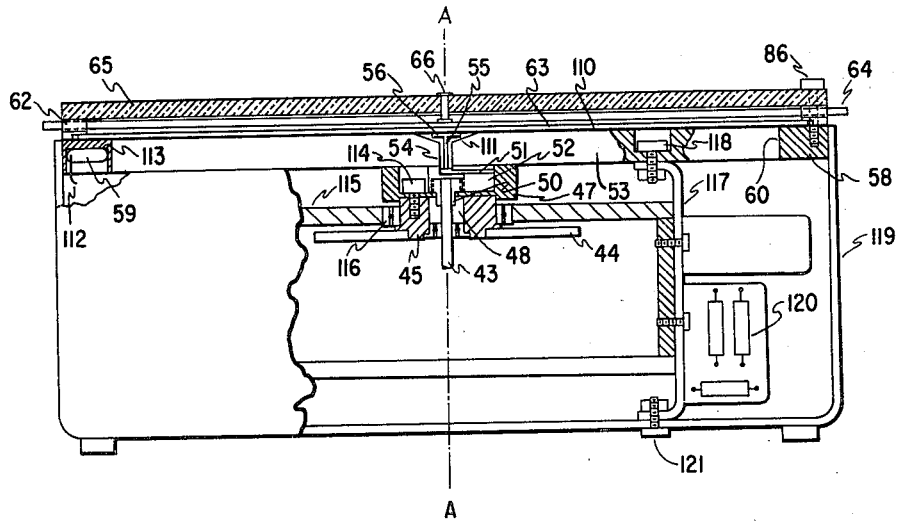
Fig. 2
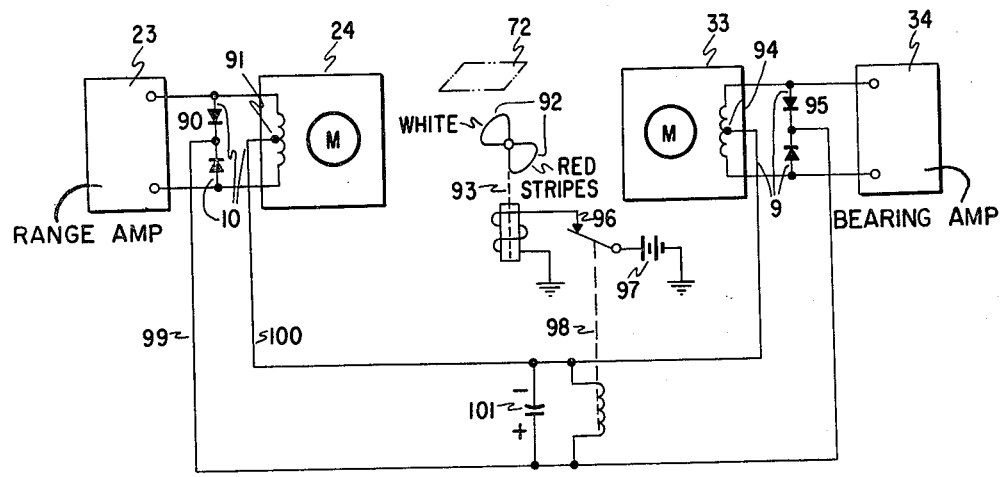
Fig. 4
GEORGE W. SHEPHERD JR.
HENRY A. HAMMERSTEIN
INVENTORS
BY 
ATTORNEY Sept. 29, 1964  G. W. SHEPHERD, JR., ETAL  3,151,310
PICTORIAL POSITION DISPLAY Filed Sept. 21, 1960  3 Sheets-Sheet 3

GEORGE W. SHEPHERD JR.
HENRY A. HAMMERSTEIN
INVENTORS
BY
ATTORNEY

United States Patent Office 3,151,310
Patented Sept. 29, 1964

3,151,310
PICTORIAL POSITION DISPLAY
George W. Shepherd, Jr., Fair Lawn, and Henry A. Hammerstein, Dumont, N.J., assignors to ACF Industries, Incorporated, New York, N.Y., a corporation of New Jersey
Filed Sept. 21, 1960, Ser. No. 57,536
5 Claims. (Cl. 340—24)

This invention relates to pictorial position displays and more particularly to the type carried in an aircraft as a navigational aid to indicate to the pilot the position of the aircraft by means of a reticle moving relative to a map of the territory over which the aircraft is flying.

The invention is designed to be employed with an aircraft's existing cockpit instrumentation of the type that gives range and bearing information from a fixed ground radio station such as a facility of either the military TACAN (Tactical Air Navigation) System or of what is proposed to be the primary commercial air navigation system of the United States popularly known as VORTAC from the fact that it transmits VOR (VHF Omni-Directional Range) bearing signals and uses the distance measuring equipment of the TACAN System for range signals. It is designed to be used as both a pilot's navigational aid and a means of developing a more effective system of air traffic control.

With existing instrumentation the pilot or navigator must spread out a map of FAA (Federal Aviation Agency) airways if flying en route, or of FAA approaches if coming into a terminal area, take the bearing and range data in the form in which it is presented as an instrument reading, convert it to map scale and plot it on the map before he can orient his position. For routine position checks during a flight he must plot a great number of points along the way. This is a tedious and time consuming operation and when the speeds of today's and tomorrow's aircraft are contrasted with the relatively small areas involved and the accuracies demanded by the approach procedures, it imposes an undue hardship on the pilot or navigator, for just at the time when he must concentrate most seriously on all the details of making an approach, he must also check most carefully on his map plotting. The pictorial position display does the map plotting automatically and he may determine his position at a glance.

As an aid to a system of air traffic control the present invention presents a method of increasing system capacity. Although conventional air craft employs numerous types of instrumentation, the great majority generally permit the pilot to receive precise navigational guidance only when proceeding along selected radials from ground stations. Inasmuch as increasing air traffic will require additional flight paths, if existing instrumentation is to be continued, either the new paths must converge over existing ground stations or a new series of ground stations must be installed to provide guidance along the new paths. Since the installation of additional ground stations provides technical and economic problems of considerable magnitude, it is desirable to make better use of the existing ground stations.

Pictorial position displays using a reticle moving in bearing and range with respect to a fixed map or chart are old. Their use has been handicapped by the fact that they are rather expensive in themselves or they are associated with the complete navigational electronic equipment and the overall expense is prohibitive for general use. In addition, the older pictorial position displays did not furnish a guide to a pilot for flying a course not marked on his chart.

The pictorial position display relates also to an important combination employed in conjunction with training equipment of the simulator type for pilot training to orient the student in the use of the display and to enable him to get the feel of flying the aircraft so that the instrument reticle follows the map course.

The maps to be used with the pictorial position display can be imprinted with flight paths of any maneuverable design and since a pilot can quickly determine what flight maneuver will correspond to a desired map direction, he can easily maneuver the aircraft, so that the map reticle follows the map paths. With the use of these units, pilots can fly off-course, circular routes and holding patterns over any point, the flying of straight VOR radials can be eliminated and system designers can develop routes which incorporate parallel and off-set courses in terminal and en route areas and planes can be cleared in and out of airports faster, without costly stacking and holding delays.

It is accordingly an object of this invention to provide an improved pictorial position display.

It is another object of this invention to provide an inexpensive pictorial position display.

It is another object of this invention to provide an improved pictorial position display in importantly integrated combination with flight simulators for pilot training.

It is an additional object to provide a pictorial position display with automatic range scale switching.

It is a still additional object to provide a pictorial position display incorporating fail-safe circuitry to indicate when the display should not be relied on.

It is a further object to provide a pictorial position display that can be used with existing cockpit instrumentation by suitable connections.

It is a still further object to provide an improved pictorial position display that will enable a pilot to fly any course whether or not marked by a flight path displayed on a map.

These objects are accomplished in the present invention by a compactly packaged rho-theta type indicator which positions a reticle relative to a scaled map of the territory over which the aircraft is flying. The indicator is adapated to be connected into an aircraft's bearing and range receivers which are tuned to a ground station transmitting bearing and range signals and to modify the receiver voltages to be compatible with the required display inputs. The bearing signals drive the reticle through a servo system about a reference axis at an angle equal to the bearing of the aircraft from the ground transmitter and the range signals drive the reticle through another servo system at a distance from the reference axis proportional to the range of the aircraft from the ground transmitter.

Each map depicts one key ground station and adjacent territory with all pertinent aircraft navigation information for that territory and is one of a series making up an entire area. When the maps are inserted they are indexed so that the key station is aligned with the reference axis and the position of the reticle relative to the scaled map indicates to the pilot the actual position of the aircraft. When the reticle comes to the edge of one map indicating that the aircraft is leaving the territory represented by that map, the pilot substitutes either another map of the adjacent territory and tunes his receivers to the ground transmitting station corresponding to the key station on the substituted map, or substitutes a larger scale map keyed to the same reference station. The servo systems then position the reticle to its scaled position on the new map with respect to the second key station or the same key station at the new scale.

Rotationally mounted to the Display above the map is a circular transparent course selector disc marked with a series of parallel lines which can be rotated to extend the lines across the map in the direction of any desired course, so that if the pilot flies his aircraft to guide the reticle travel parallel to the course lines he is assured of being on course.

FIG. 2 is an elevation view partially in section taken along the line 2—2 of FIG. 3.

FIG. 4 is an electrical schematic diagram of the fail-safe circuit of the display.

Figure 1:
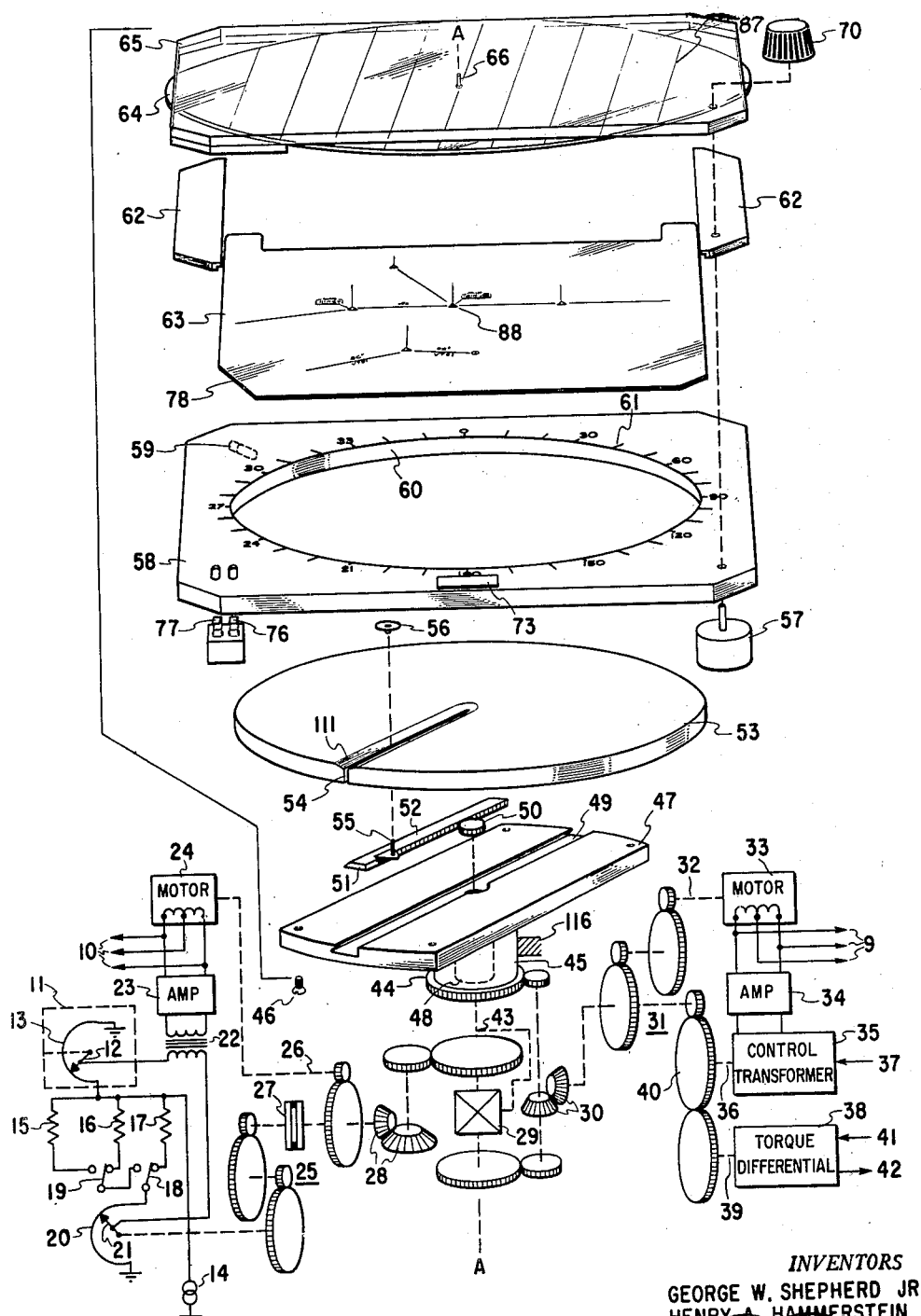
FIG. 1 is a perspective assembly drawing partially exploded of the Pictorial Position Display.

Referring now to FIG. 1 which is an exploded drawing illustrating the principal of operation of the Pictorial Position Display, the range signal input is obtained from the output of the applicable navigational instrument in the aircraft which in FIG. 1 is shown as a Tacan type DMET 11 (Distance Measuring Equipment Tacan) such as is manufactured by the Federal Division of International Telephone and Telegraph Company of Clifton, New Jersey.

The range signal is in the form of angular position of arm 12 on grounded potentiometer 13 which is in the DMET 11. The position of arm 12 is converted to voltage in potentiometer 13 and an electrical connection from arm 12 is then made to a conventional servo amplifier system which drives the remote shaft 26, gears 28, one input gear of mechanical differential 29 and through shaft 43 extending through hollow gear 44 to pinion 50 which translates rack 52 in radius from reference axis A—A. Arm 21 of follow-up potentiometer 20 is mechanically coupled through a suitable gear reduction 25 to remote shaft 26. A clutch 27 is provided between the range servo motor 24 and the gear train 25 to allow the motor to continue turning after the arm on follow-up potentiometer 20 contacts the overtravel stop, not shown, thus protecting the gear train.

The ungrounded side of potentiometer 13 is connected to the junction of the three range resistors 15, 16, and 17. The other side of resistors 15 and 16 is connected to the normally open and normally closed contacts of microswitch 19 respectively. The other side of resistor 17 is connected to the normally closed contact of microswitch 18. The pole of microswitch 19 is connected to the normally open contact of microswitch 18. The pole of microswitch 18 is connected to one side of follow-up potentiometer 20, the other side of potentiometer 20 being grounded. An alternating reference voltage 14, preferably 26 volts 400 cycle A.C. is applied to the junction of the three range resistors 15, 16, and 17. Movable arm 12 of potentiometer 13 is connected in series with the primary winding of isolation transformer 22 and to movable arm 21 of potentiometer 20.

The voltage difference between potentiometer arms 12 and 21 transformed through isolation transformer 22 constitutes the error voltage to the amplifier 23 and is of such character as to drive the range servo motor 24 and thereby arm 21 in a direction to reduce the error voltage to zero. Leads 10 connected on one end to both sides and the center tap of the control winding of range servo motor 24 are connected at the other end to the fail-safe circuit of FIG. 4.

The error voltage fed into amplifier 23 depends not only upon the position of potentiometer arms 12 and 21 but also upon the amount of resistance in the electrical part of the loop. It can readily be observed that for any angular position of the range shaft of the DMET 11 the voltage difference between the arms 12 and 21 will be determined by the difference in resistance from the junction of the three range resistances 15, 16 and 17 to the two arms, as the current from the reference voltage source 14 splits on either side of the junction. This voltage difference then determines the direction and magnitude of the current and correspondingly the error voltage across the primary winding of transformer 22.

The invention illustrated in FIG. 1 is adapted for use with an Omni-Bearing Indicator (OBI), not shown, such as the type 337A-2 manufactured by Collins Radio Company of Cedar Rapids, Iowa. Of course, it should be understood that the equipment may be adapted to be used with any device other than an OBI which supplies bearing information from the aircraft's radio receiver.

An OBI gives a Magnetic Bearing reading from the aircraft to the VOR station. It contains a differential generator, not shown, the shaft of which is keyed to the OBI dial and is rotated in Bearing by the computer output ahead of it. Normally the input to the stator leads of the differential generator comes from the aircraft's magnetic compass, also not shown, and the rotor output leads reading Bearing-Heading are connected to the Double Barred Pointer Synchro of a Radio Magnetic Indicator (RMI) if one is used, also not shown, such as the type 332C-1 manufactured by the Kearfott Company, Inc., of Little Falls, New Jersey. To operate the display, the OBI differential generator stator leads are disconnected from the compass and a voltage representing zero heading is fed to the stator leads. The output of the OBI differential generator rotor is then in the form of a voltage representing Magnetic Bearing to the VOR station, and is connected into the apparatus shown in FIG. 1 by leads 37 to another conventional servo system which drives the remote shaft 32, helical gears 30, the other input gear of mechanical differential 29, and hollow gear 44 which through hub 45 mounted in ball bearings 116 rotates bearing plate 47 about reference axis A—A through an angle corresponding to the bearing input on leads 37 from the OBI. The input to differential 29 is to compensate for the translation of rack 52 with rotation of bearing plate 47 which would otherwise introduce a range error into the displayed position. Rack 52 therefore remains in the same position with respect to axis A—A as before rotation. In this bearing servo system, the synchro stator voltage on leads 37 is connected to the stator windings of control transformer 35. The rotor shaft of control transformer 35 is mechanically coupled to shaft 36 and by suitable gearing 31 to the bearing drive 32. The error voltage across the rotor leads of control transformer 35 is determined by the relative angular displacement between the position of shaft 36 and the shaft position in the OBI. The error voltage is amplified in amplifier 34 and fed to servo motor 33 which rotates shaft 36 through the reduction gearing 31 to reduce the error voltage to zero. Leads 9 connected at one end to both sides and the center tap of the control winding of range servo motor 33 are connected to the Fail-Safe circuit of FIG. 4. When the cockpit instrumentation does not use an RMI, torque differential 38 is not energized.

If an RMI is employed in the aircraft, the Bearing-Heading information previously supplied from the OBI must be restored to the Double Barred Pointer Synchro to make the RMI operative. For this purpose, torque differential 38 is employed. The magnetic compass output leads previously disconnected from the OBI as described heretofore are connected through leads 41 to the stator windings of torque differential 38 whose shaft is mechanically coupled to shaft 39 which being geared to the bearing drive 32 of the Pictorial Position Display through gearing 31 corresponds to the OBI input bearing shaft, and the rotor windings output of torque differential 38 which is now Bearing-Heading is connected through leads 42 back to the RMI Double Barred Pointer Synchro, so that the instrumentation will operate as before.

The foregoing connections to conventional bearing indicating equipment are described merely as examples and not to limit the application of the invention to particular indicators or instrumentation. Any navigational computer supplying bearing information from a reference station may be employed by making suitable connections in a similar manner.

Referring to FIG. 2 in conjunction with FIG. 1 to give more detailed information, the basic support of the device is gear box 115. Rotationally mounted about reference axis A—A to the top plate of the gear box by ball bearings 116 is hub 45. Press fitted to hub 45 is hollow gear 44. Bearing plate 47 is fastened to hub 45 by screws 114 in a plane perpendicular to reference axis A—A so that as bearing servo motor 33 drives hollow gear 44, bearing plate 47 rotates about axis A—A through an angle corresponding to the output signal from the aircraft's bearing indicator.

Rack 52 is slidably mounted in a longitudinal slot 49 in bearing plate 47. The slot is offset from the reference axis A—A. Rack 52 is translatably driven through pinion 50 on shaft 43 extending through hole 48 by range servo motor 24. The rack carries an offset bracket 51 to which is mounted by an elongated rivet 55 flared over on both ends, reticle 56. The bracket length is such that the reticle always moves radially and perpendicularly with respect to reference axis A—A. The reticle in the preferred embodiment is in the form of a bull's-eye coated with orange-colored paint to provide maximum day and night visibility.

Circular lighting disc 53 is fastened to bearing plate 47 by four screws 46, so that it rotates with the bearing plate. The lighting disc has a radial slot 54 cut in it to allow passage of rivet 55 when the rack is translated. The top of the slot is tapered 111 to allow passage of reticle 56. The lighting disc is made from some light conducting material such as methyl methacrylate. Its lower surface is treated in a suitable manner to make the lighting disc opaque to reflect the light upwards and so that the mechanism below is not visible. In the preferred embodiment it is covered with white paint.

Dial plate 58 is fastened to gear box 115 by brackets 117 and screws 118 in a plane perpendicular to reference axis A—A and so that central hole 60 in the dial plate is centrally located about axis A—A. Lighting disc 53 fits rotatably in hole 60 which has its periphery marked with the points of a compass rose 61.

Also around the periphery of central hole 60 and cut from the bottom of dial plate 58 and in an upwards direction are a number of longitudinal slots 113. In these slots fastened with a suitable adhesive such as one of the epoxy resins are a number of incandescent lamps 59. The leads 112 of all of the incandescent lamps 59 are brought out and connected in parallel. Adjustable intensity control rheostat 57 is connected across the secondary of a step down transformer, not shown, the primary of which is across the A.-C. reference voltage line and which steps the reference voltage down to a value suitable for the lamps 59. The circuit connections are not shown.

When assembled the top of reticle 56 which rides over radial slot 54 in taper 111 is flush with the top of lighting disc 53 and just below the bottom surface of the dial plate 58. A thin transparent plastic sheet 110 shown in FIG. 2 only is stretched over hole 60 and fastened by a suitable adhesive to the dial plate 58 to protect the reticle 56 from being damaged by the maps 78 whose description follows. It should be understood that the map 78 during insertion is kept as close to the reticle 56 as possible to eliminate parallax.

Figure 3:
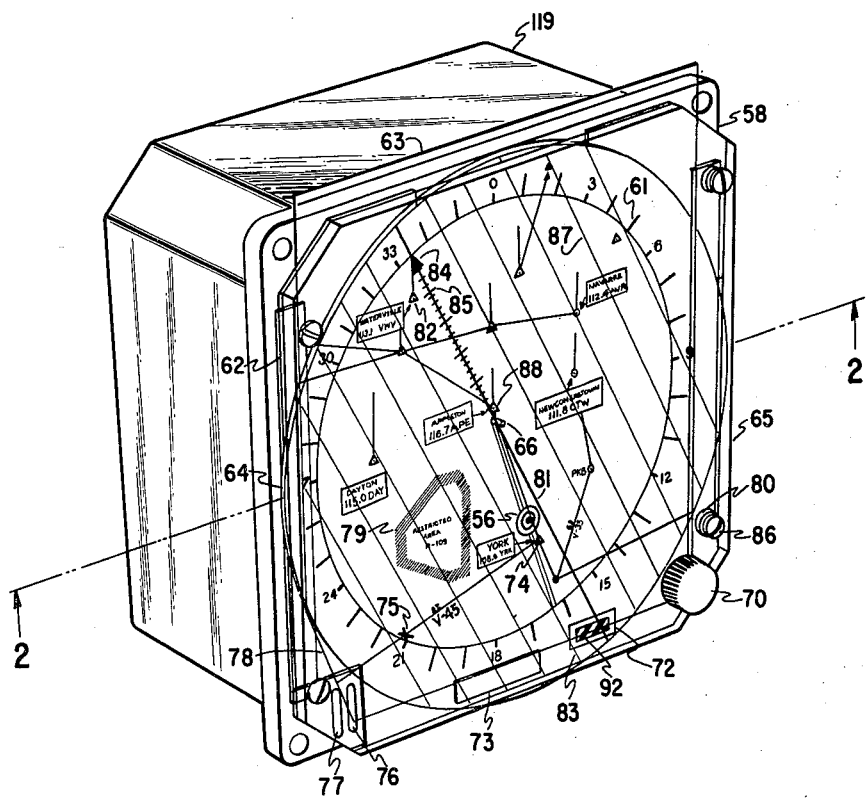
FIG. 3 is a perspective view of the completely assembled display.

FIG. 3 shows the complete assembly. Knob 70 adjusts the intensity of lamps 59 through a rheostat 57.

Map guides 62 are fastened to both sides of dial plate 58 and map stop 73 is also fastened to the dial plate between the guides so that when a map 63 is inserted through the guides and against the stop, the key ground transmitter reference station 88 pictured on the map and to which the aircraft's bearing and range receivers are tuned is aligned over reference axis A—A.

Each map is in the form of a slide made from a transparent plastic film, in this embodiment Mylar and pictures all of the pertinent aircraft navigation information for the area adjacent to the key reference station. It locates for instance VHF Omni-Directional Range (VOR) stations and Automatic Direction Finding (ADF) stations and their appropriate frequencies and the radial distances between as well as en route airways and terminal approaches and other useful navigational information such as are shown for instance in the terminal area charts, low level navigation charts, and intermediate altitude charts presently being manufactured by Jeppesen & Company of Denver, Colorado. Magnetic North is up on all maps. A typical map 63 using the VORTAC station at Appleton, Ohio 88 as the key reference station is shown in FIG. 3.

Maps can be made to any scale but are preferably made in scales of 10, 20, and 48 nautical miles to the inch. A 10 mile per inch map is preferred for terminal areas while a 48 mile per inch map is preferred en route. For areas where more detail is required such as approaches to terminal areas, the 20 mile per inch scale may be used. Maps are constructed with the left hand corner of their leading edge, as inserted, mitred 78. Maps are cut to three mitre dimensions depending upon the map scale used.

Microswitch actuators 76 and 77 extend above the top surface of dial plate 58 and actuate the poles of switches 18 and 19 respectively. When the actuators are in their normally undepressed condition the poles of switches 18 and 19 are in their normal closed position with respect to their double throw contacts as shown schematically in FIG. 2. Of the three mitre dimensions used, the deepest mitre corresponds to a map scale of 48 nautical miles per inch. When this scale map with its corresponding mitre 78 is inserted into the map guides 62, the map slide does not contact either of the actuators and only resistance 17 is in the range servo circuit. When the 20 nautical mile per inch map is inserted, the mitre dimension is such that microswitch actuator 76 is depressed and the pole of switch 18 is thrown to the normally open contact, so that only resistance 16 is in the range servo circuit. This is the situation illustrated in FIG. 3. When the 10 nautical mile per inch map is inserted, its mitre dimension is such that both microswitch actuators 76 and 77 are depressed and the poles of both switches 18 and 19 are thrown to their normally open contacts, so that only resistance 15 is in the circuit. As discussed heretofore an increase in resistance corresponds to a smaller map scale, so resistor 15 has the lowest value of resistance and resistor 17 has the largest value of resistance for this switching plan. Of course any number of scales, actuators, switches, and resistances could be used.

A fail-safe marker 92 which is the on-off position on the rotor of an electromagnetic relay 93 is mounted to dial plate 58 and can be viewed through window 72 made from some suitable transparent plastic material such as methyl methacrylate. The Fail-Safe circuitry shown in FIG. 4 is designed to indicate by a visual warning signal to an observer when there is trouble in the aircraft's navigation equipment to which the pictorial position display is connected. When the navigation equipment is working correctly the upper surface of rotor 92 as illustrated in FIG. 4 shows white. When the output of either the range or bearing indicator is above a specified operating voltage, or the power fails, the rotor rotates through approximately 90 degrees and a red and white striped warning signal indicates to the observer that he cannot rely on the accuracy of the display.

The operation of the Fail-Safe indicator will now be described. Leads 10 and 9 which were broken in FIG. 1 because of space limitations are shown connected into the fail-safe circuitry. Amplifier 23 and range servo motor 24 as well as amplifier 34 and bearing servo motor 33 shown in FIG. 1 are repeated for clarity. A pair of diodes 90 are connected across the output of the range servo amplifier 23 in series opposition. Similarly a pair of diodes 95 are connected in series opposition across the output of bearing servo amplifier 34. The junctions between each pair of diodes 90 and 95 are connected together by connector 99. The midpoint 91 of the control coil of two phase range servo motor 24 is connected to the midpoint 94 of the control coil of two phase bearing servo motor 33 by connector 100. Connected in parallel across the lines joining diode midpoints and servo motor control coil midpoints are the holding coil of relay 98 and its associated smoothing capacitor 101. Normally closed contact 96 of relay 98 connects the holding coil of relay 93 to a suitable source of D.C. current from the power supply 97. Rotor 92 is shown in the position it assumes when the holding coil of relay 93 is energized. The white surface of the rotor is then visible to the observer through window 72. The polarities of the diodes are such that regardless of the instantaneous phase of the output of either the range or bearing servo amplifier, current flows in connector 99 in the direction from the midpoint of diode pair 90 through the holding coil to point 91 and from the midpoint of diode pair 95 through the holding coil to point 94. Of course when either servo is driven to null no current flows in connectors 99 or 100. When the bearing or range indicator in the aircraft's navigation equipment presents a signal which is different from the corresponding bearing or range position of the pictorial position display reticle 56, current flows in the fail-safe circuit as described. As the servo drives to a null, the current decreases and capacitor 101 discharges through the holding coil of relay 98. The discharge current from capacitor 101 cannot get back into either servo system, because it is blocked by the bias of the diode pairs. The characteristics of the holding coil of relay 98 are such that for bearing and range signals from the aircraft's navigation equipment that are within specification, insufficient current flows through the holding coil to pull in the relay. However, if the input signal from either the bearing or range indicator goes beyond its specified range because of some malfunction in the navigation equipment, the amplified servo signal passing through the holding coil of relay 98 will increase to the point that it will pull in the pole of relay 98, opening contact 96, which in turn de-energizes the holding coil of relay 93 so that the rotor flips to its normal de-energized position which presents the warning red striped signal through the window 72 to the observer. Similarly if the power fails, voltage source 97 is reduced to the point that the holding coil of relay 93 is de-energized and the warning signal is again displayed.

A cover plate 65 made from some transparent material such as methyl methacrylate is spaced away from the maps 63 by standoffs 80 and fastened with screws 86 to dial plate 58. Rotationally suspended about axis A—A from the cover plate by pin 66 is circular courser disc 64, which is also made from a transparent plastic material such as methyl methacrylate. Marked on the courser disc by engraving or painting or some other suitable method are a series of parallel lines 87. The line through the center of rotation of the courser disc has an arrowhead 84 whose tip is located at a radius from the center of rotation corresponding to the radius of the locus of the azimuth markings on the compass rose 61, so that as the courser disc is rotated, the arrowhead sweeps around in alignment with the points of the compass rose. The radius of the line containing the arrowhead is marked in equal increments from the center line with range markings 85. In the present embodiment the markings are 1/10 of an inch apart.

Referring again to FIG. 2, the pictorial position display is seen to be compactly packaged including the electronic components 120 about gear box 115 by suitable brackets and fastenings. The entire unit is enclosed by cover 119 which fits around dial plate 58 and is secured to the gear box structure by brackets 117 and suitable fastenings 121. Electrical connections from the display to external power sources and the aircraft's navigational computers are made through suitable connectors and cabling, not shown, to the appropriate sources.

The operation of the invention will now be described. The aircraft carrying the pictorial position display will be assumed to be proceeding along Victor Airway 45 from West to East with his destination Waterville, Ohio and the display operating. As the reticle approaches the circular periphery of the compass rose in the southwest quadrant of the map, the pilot substitutes the map 63 shown in FIG. 3 for the map previously in map 62. At the same time he tunes his VOR and DMET receivers to the VORTAC Station at Appleton which occupies the key reference station position at 88 over the reference axis A—A on the substituted map.

The bearing output signal from the bearing indicator with respect to the Appleton VORTAC transmitter is fed into the display bearing servo system through leads 37 and bearing plate 47 is rotated about reference axis A—A so that the bearing represented on the map by the reticle with respect to the map position of Appleton corresponds to the aircraft's actual position with respect to Appleton. Similarly the range output signal from the DMET 11 with respect to the Appleton VORTAC transponder is fed into the display range servo system and drives rack 52 in radius from reference axis A—A so that the map range of the reticle with respect to the map position of Appleton corresponds to the aircraft's actual range with respect to Appleton. The reticle will then assume a position approximating that indicated at X75.

The aircraft then proceeds along Victor Airway 45 represented on the map by the line through X75 and the symbol V-45. The pilot can check his position by observing that the reticle moves along the line V-45. When the reticle arrives at the position represented by the VOR fix at York 74, the aircraft has cleared Restricted Area R-109 79 and is free to proceed directly to Waterville 82.

However, there are no map airway lines drawn between York and Waterville to guide him. Therefore he rotates courser disc 64 until the course lines are parallel to his departure and destination points, i.e., York and Waterville. This is the courser disc position shown in FIG. 3. The arrowhead 84 then indicates that he should keep his compass heading at 334 degrees to keep on course. The pilot is then able to fly to Waterville manipulating his controls so that the reticle moves parallel to the two adjacent course lines 81 and 83 and be assured that he is on course without the necessity for constant checks. The position of the reticle 56 in FIG. 3 indicates this stage of the flight.

Once the aircraft gets north of Appleton 88, the pilot may determine his distance from Waterville 82 by counting the number of range markers 85 between Appleton and the reticle and using an appropriate scale factor.

When the aircraft approaches Waterville, the pilot may wish to have more terminal information available, and so he will substitute a larger scale map keyed to the same reference station, Appleton and which will cover and trip both actuators 76 and 77 to increase the rack travel per unit DMET signal input as described heretofore.

In this manner the pilot by switching maps and tuning to the appropriate key reference stations can obtain a continuous visual presentation of a flight across country.

Figure 5:
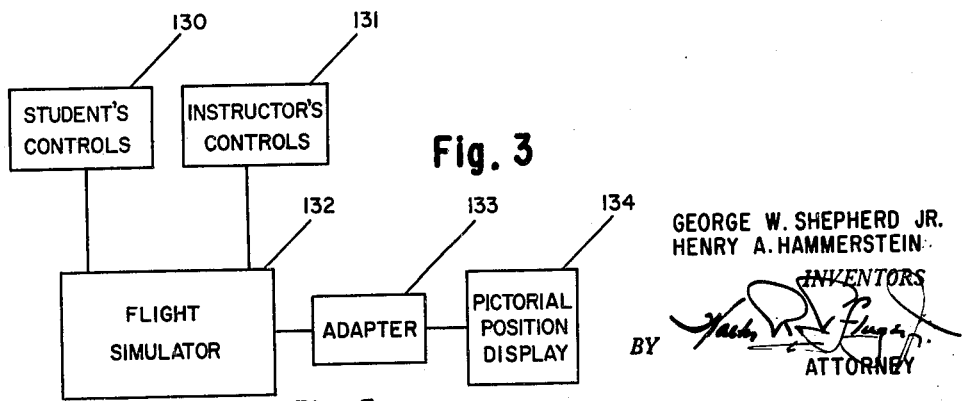
FIG. 5 is a block diagram of the Pictorial Position Display combined with a training device or simulator for training a student in navigational problems.

As shown in FIG. 5, the pictorial position display 134 is importantly combined and employed with a trainer or flight simulator 132 such as the KC-135A Trainer, Flight Simulator manufactured by the ACF Electronics Division of ACF Industries, Incorporated of Riverdale, Maryland, described in U.S. Air Force Publication T.O. 43D3-3-8-1, Handbook, Operation and Service Instructions for the KC–135A Trainer Flight Simulator. When the student "flies" this simulator, he operates the same controls 130 as those in the aircraft, and receives the same responses he would experience during actual flight. Particular ground radio stations are set into the simulator from either the student's controls 130 or the instructor's controls 131. Simulated bearing and range signals from this station are then "received" in the simulator 132, modified as required in the adapter 133, and as modified fed into the input of the pictorial position display 134, to cause motion of the reticle corresponding to the position of the simulated aircraft. Adapter 133 might be incorporated in the simulator 132 for this purpose. The student or instructor would then switch from station to station as the aircraft proceeds along the simulated course in the manner described above for an actual flight.

The foregoing description is illustrative of a preferred embodiment only of the present invention and is not intended in any way to limit the scope of the invention which is set forth in the following claims.

What is claimed is:

1. An instrument to display the position of a vehicle for use with radio receiving means supplying directional and range information relative to a reference station to which it is tuned comprising: a fixed support; an axis relative to said support corresponding to the location of a reference station; a movable reticle indicative of said vehicle's position; reticle positioning means on said support and including a first element movable in angular position about said axis; a first servo means to drive said first element about said axis; a second element to which said reticle is attached translatably mounted on said first element and variable in distance along a radial line from said axis, and a second servo means to drive said second element along said radial line; connecting means for applying said directional information to said first servo drive means so the angular position of said first element about said axis corresponds to said vehicle direction relative to said reference station and for applying said range information to said second servo drive means so the reticle moves a distance from said axis corresponding to said vehicle range relative to said reference station; a transparent map including a representation of said reference station and contiguous territory removably mounted in a fixed position on said fixed support over and adjacent said reticle so that said reticle is plainly viewable beneath said map; and map indexing means for aligning said map representation of said reference station on said axis.

2. An instrument for assisting a pilot to navigate an aircraft for use with radio receiving means supplying directional and range information relative to a reference station to which it is tuned comprising: a fixed support; an axis relative to said support corresponding to the location of a reference station; a movable reticle indicative of said vehicle's position; reticle positioning means on said support and including a first element movable in angular position about said axis, a first servo means to drive said first element about said axis, a second element to which said reticle is attached translatably mounted on said first element and variable in distance along a radial line from said axis, and a second servo means to drive said second element along said radial line; connecting means for applying said directional information to said first servo drive means so the angular position of said first element about said axis corresponds to said vehicle direction relative to said reference station and for applying said range information to said second servo drive means so the reticle moves a distance from said axis corresponding to said vehicle range relative to said reference station; a transparent map including a representation of said reference station and contiguous territory removably mounted to said support in a fixed position over and adjacent said reticle, said map also including a representation of a flight path to assist a pilot to fly the flight path by maneuvering the aircraft so that said reticle follows said flight path representation; and map indexing means for aligning said map representation of said reference station on said axis.

3. An instrument to display the position of a vehicle for use with radio receiving means supplying directional and range information relative to a reference station to which it is tuned comprising: a fixed support; an axis relative to said support corresponding to the location of a reference station; a movable reticle indicative of said vehicle's position; reticle positioning means on said support and including a first element movable in angular position about said axis, a first servo means to drive said first element about said axis, a second element to which said reticle is attached translatably mounted on said first element and variable in distance along a radial line from said axis, and a second servo means to drive said second element along said radial line; connecting means for applying said directional information to said first servo drive means so the angular position of said first element about said axis corresponds to said vehicle direction relative to said reference station and for applying said range information to said second servo drive means so the reticle moves a distance from said axis corresponding to said vehicle range relative to said reference station; a transparent map including a representation of said reference station and contiguous territory mounted to said support over and adjacent said reticle; map indexing means for aligning said map representation of said reference station on said axis; and course navigating means including a transparent plate having a series of parallel course line markings rotatably mounted adjacent to said map.

4. An instrument to display the position of a vehicle for use with radio receiving means supplying directional and range information relative to a reference station to which it is tuned comprising: a fixed support; an axis relative to said support corresponding to the location of a reference station; a movable reticle indicative of said vehicle's position; reticle positioning means on said support and including a first element movable in angular position about said axis, a first servo means to drive said first element about said axis, a second element to which said reticle is attached translatably mounted on said first element and variable in distance along a radial line from said axis, a range servo motor drive means to drive said second element along said radial line, a control circuit to generate a control voltage determining the distance said range motor drive means drives said second element; connecting means for applying said directional information to said first servo drive means so the angular position of said first element corresponds to said vehicle direction relative to said reference station and for applying said range information to said control circuit to produce a control voltage corresponding to said vehicle range relative to said reference station; a series of transparent scale maps, each map picturing a reference station and adjacent territory and arranged to be removably mounted in turn to said support and adjacent said reticle in a fixed position; map indexing means for aligning said map representation of said reference station on said axis; and scale changing means for changing said range servo motor control voltage to correspond to changes in map scale, said scale changing means including a plurality of impedances in the control circuits whose resultant value determines the control voltage, a plurality of switches arranged to be actuated by said indexed maps, the actuated combination of said switches determining the impedance resultant value; a classification of shapes for different scale maps, maps of the same scale having substantially the same shape whereby the map shape determines the switch combination actuated, so that the control voltage to the range servo motor drive means drives the reticle a distance from said axis which when read on the scale of the map positioned in said indexing means corresponds to said vehicle range relative to said reference station.

5. Apparatus for training pilots comprising in combination means simulating the flight of an aircraft under the control of a trainee, said simulating means including means for simulating directional and range signals from a reference station to said aircraft; and a pictorial position display comprising: a fixed support; an axis relative to said support corresponding to the location of the reference station; a movable reticle indicative of said aircraft's position; reticle positioning means on said support and including a first element movable in angular position about said axis; a first servo means to drive said first element about said axis; a second element to which said reticle is attached translatably mounted on said first element and variable in distance along a radial line from said axis, and a second servo means to drive said second element along said radial line; connecting means for applying said directional signals to said first servo drive means so the angular position of said first element about said axis corresponds to said aircraft direction relative to said reference station and for applying said range signals to said second servo drive means so the reticle moves a distance from said axis corresponding to said aircraft range relative to said reference station; a transparent map including a representation of said reference station and contiguous territory removably mounted to said support over and adjacent said reticle so that said reticle is plainly viewable beneath said map; and map indexing means for aligning said map representation of said reference station on said axis.

References Cited in the file of this patent
UNITED STATES PATENTS

| | | |
|---|---|---|
| 2,116,508 | Colvin | May 10, 1938 |
| 2,387,875 | Brann | Oct. 30, 1945 |
| 2,389,359 | Grow | Nov. 20, 1945 |
| 2,485,301 | Lowkrantz | Oct. 18, 1949 |
| 2,528,502 | Florez et al. | Nov. 7, 1950 |
| 2,547,011 | Jacobsen | Apr. 3, 1951 |
| 2,627,673 | Droz | Feb. 10, 1953 |
| 2,679,033 | Hartman | May 18, 1954 |
| 2,721,993 | Medlar | Oct. 25, 1956 |
| 2,914,853 | Michell | Dec. 1, 1959 |
| 2,929,553 | Child | Mar. 22, 1960 |
| 2,950,460 | Seifried | Aug. 23, 1960 |
| 2,979,707 | Seifried et al. | Apr. 11, 1961 |
| 3,059,233 | Guarino et al. | Oct. 16, 1962 |
| 3,099,008 | Fernandez | July 23, 1963 |

OTHER REFERENCES
Aviation Week (Publ.) pages 57–62, Oct. 23, 1950.